US006922743B2

(12) United States Patent
Mizuno

(10) Patent No.: US 6,922,743 B2
(45) Date of Patent: Jul. 26, 2005

(54) DISK SUBSYSTEM WITH DISK ACCESS CONTROLLER INCLUDING ACCESS REQUEST TABLE WITH CROSS-CALL FUNCTION

(75) Inventor: Makio Mizuno, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 333 days.

(21) Appl. No.: 10/196,161

(22) Filed: Jul. 17, 2002

(65) Prior Publication Data

US 2003/0158980 A1 Aug. 21, 2003

(30) Foreign Application Priority Data

Feb. 15, 2002 (JP) ........................................ 2002-037604

(51) Int. Cl.[7] .......................... G06F 13/00; G06F 12/00
(52) U.S. Cl. ............................ 710/38; 710/36; 710/46; 709/213; 709/238; 709/239; 711/114
(58) Field of Search ............................ 710/36, 38, 46; 709/213, 238, 239

(56) References Cited

U.S. PATENT DOCUMENTS

| | | | | |
|---|---|---|---|---|
| 4,697,232 A | * | 9/1987 | Brunelle et al. | ............... 710/46 |
| 6,092,216 A | * | 7/2000 | Kobayashi et al. | ............ 714/9 |
| 6,502,167 B1 | * | 12/2002 | Tanaka et al. | .............. 711/114 |
| 2002/0091828 A1 | * | 7/2002 | Kitamura et al. | ........... 709/226 |

* cited by examiner

Primary Examiner—Tammara Peyton
(74) Attorney, Agent, or Firm—Mattingly, Stanger, Malur & Brundidge, P.C.

(57) ABSTRACT

Transmission/reception of each request is carried out through one and the same port. When requests are concentrated on one port, the port has to process all the requests. The processing load on the port increases correspondingly. A table in which request processing and its control information are recorded and a table in which ports that can be requested are recorded are prepared in a shared area inside a disk subsystem. Processing is requested with reference to those tables. The load on the port on which requests are concentrated is distributed, and the throughput to request sources is improved.

12 Claims, 12 Drawing Sheets

FIG.2

| 205: DETAILS OF A REQUEST | 207: CONTROL INFORMATION ||| 225: READY FLAG | 230: CACHE STORED ADDRESS | 235: DATA TRANSMISSION END FLAG |
|---|---|---|---|---|---|---|
| | 210: SOURCE PORT IDENTIFIER | 215: SEQUENCE NUMBER | 220: PORT NUMBER | | | |
| | | | | | | |

| 305: SOURCE PORT | 310: REQUEST PORT |
|---|---|
| | |
| | |

| 405: SOURCE PORT NUMBER | | 410: DESTINATION PORT NUMBER | |
|---|---|---|---|
| 415: SEQUENCE NUMBER | | | |
| 420: A KNOWLEDGEMENT NUMBER | | | |
| 425: DATA OFFSET | 430: RSV. | 435: CODE BITS | 440: WINDOW SIZE |
| 445: CHECKSUM | | 450: URGENT POINTER | |
| 455: OPTION | | | 460: PADDING |
| 465: DATA | | | |

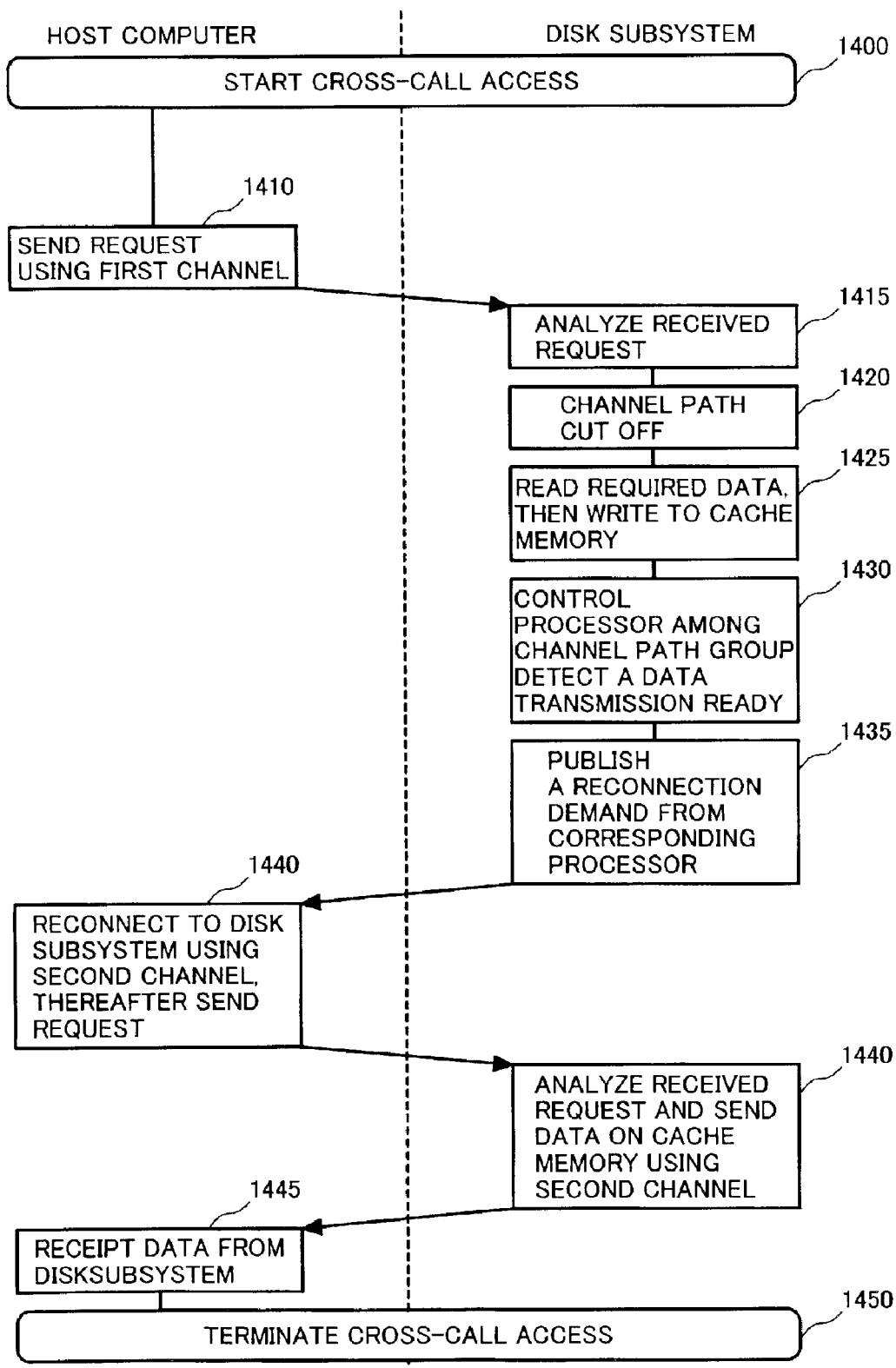

DISK SUBSYSTEM WITH DISK ACCESS CONTROLLER INCLUDING ACCESS REQUEST TABLE WITH CROSS-CALL FUNCTION

BACKGROUND OF THE INVENTION

1. Field of the Invention

The present invention relates to a network storage system using a disk subsystem with a plurality of I/O ports connectable to a network, and particularly relates to a technique for preventing a network band from being oppressed due to access concentration, and for reducing the load on control processors for controlling the I/O ports.

2. Description of the Related Art

There is a disk control unit for storing and reading data in and from a plurality of disk units. The disk units and the disk control unit are collectively called a disk subsystem.

FIG. 1 shows an example of a disk subsystem. The reference numeral 100 represents a disk control unit, which has an interface with a host computer and a disk unit 140. The reference numeral 105 represents I/O channels, which are I/O interfaces with the host computer.

The reference numeral 110 represents channel controllers, each issuing instructions to the entrails of the disk control unit so as to process requests from the host computer. The reference numeral 115 represents connection paths between the channel controllers 110 and a cache memory controller 120 and between the channel controllers 110 and a shared memory controller 125. Communication of user data and communication of shared data are made through these paths. The reference numeral 120 represents a cache memory controller, which has a cache memory for temporarily storing user data from the host computer and the disk unit 140. The cache memory controller 120 controls cache memory accesses from the channel controllers 110 or disk access controllers 135. The reference numeral 125 represents a shared memory controller, which has a global memory for storing control information about communications made inside the disk control unit 100, and tables for attaining cross-call. The shared memory controller 125 controls shared memory accesses from the channel controllers 110 and the disk access controllers 135. The reference numeral 130 represents connection paths between the disk access controllers 135 and the cache memory controller 120 and between the disk access controllers 135 and the shared memory controller 125. Communication of user data and communication of shared data are made through these paths. The reference numeral 140 represents a disk unit, which is constituted by a plurality of drives and stores user data and the like. The connection mode between the host computer and the disk subsystem changes in accordance with the technical background and the needs of users. In recent years, popularization, speeding-up and bandwidth extension of network infrastructure have been advanced with the explosive popularization of the Internet, the appearance of gigabit Ethernet, and so on. Here, "Ethernet" is a trademark registered by Xerox Corporation, the United States. In addition, networks using the IP (Internet Protocol) (hereinafter, referred to as "IP networks") have advantages such as low administration/running cost, good interconnectivity as typified by LAN (Local Area Network), and the like. Thus, there is a movement toward application of such IP networks to an SAN (Storage Area Network). The SAN means a network environment in which at least one host computer and at least one storage unit have been connected. As the storage unit, there is a disk array unit (hereinafter, referred to as "disk subsystem") or the like.

On the other hand, in the IP network, the transmission path between the host computer and the disk subsystem is determined by a routing protocol. Examples of such a typical routing protocol include an RIP (Route Information Protocol), an OSPF (Open Shortest Path First), etc.

The RIP chooses the path on which path control information is transmitted on the network and the number of passed routers (called "hop count") is the smallest out of the paths between the host computer and the disk subsystem. The OSPF generates path control information on the basis of link state (topology) information of each network so that the path control information is exchanged between adjacent routers. In the OSPF, weighting (called metric) is provided to each link, and a path by which the metric is reduced is chosen. The metric includes the transmission delay, the line speed, the kind of topology, and so on, as well as the hop count. Accordingly, when requests are issued from a plurality of host computers to the disk subsystem, the path determined by the aforementioned RIP or OSPF is used, and accesses are concentrated on the determined path. In addition, there are a non-specific number of users on the IP network, and a comparatively large volume of data is often requested by accesses to the disk subsystem. On the disk subsystem side, accesses are concentrated on an I/O port of the disk control unit so that a high load is applied to a control processor controlling the I/O port. This results in the deterioration of the transfer performance.

As a technique for avoiding such deterioration, there is a cross-call function (hereinafter, referred to as "ESCON cross-call") in a disk subsystem in which a host computer has been connected through an ESCON (Enterprise Systems Connection Architecture) channel in a mainframe. The ESCON cross-call is aimed at improvement of the transfer performance based on elimination of overhead spent when requested data in response to accesses from the host computer is extracted from a disk unit (strictly in the seek time of a disk), and the fail over for the occurrence of failures.

The ESCON cross-call is carried out among a plurality of channels (called a channel path group). The ESCON cross-call is a technique by which a reply to a request received from a host computer through a first channel is allowed to be transmitted from a second channel different from the first channel. Description will be made below on the ESCON cross-call with reference to FIGS. 12 and 13.

FIG. 12 shows the apparatus configuration. The reference numeral 1305 represents a host computer, which issues requests to a disk subsystem 1370. The reference numerals 1310a, 1311a, 1312a, 1313a, 1314a, 1315a, 1316a and 1317a represent ESCON channels, which are I/O interfaces supporting a mainframe. The reference numerals 1310b, 1311b, 1312b, 1313b, 1314b, 1315b, 1316b and 1317b represent channel control processors, which decode requests received from the host computer 1305, and issue instructions for internal processing of the disk subsystem in accordance with the details of the requests.

The reference numeral 1320 represents a cache memory, which is a memory area for temporarily storing user data from the host computer and data of a disk unit 1340. The reference numeral 1325 represents a shared memory, which is a memory area for storing control information required for the entrails of the disk subsystem. The reference numerals 1330, 1331, 1332, 1333, 1334, 1335, 1336 and 1337 represent disk control processors, which control accesses to the disk unit in accordance with requests from the channel control processors. The reference numeral 1340 represents a disk unit, which is a unit constituted by a plurality of drives for storing data. The reference numeral 1350 represents a disk access controller, which includes the disk control processors and has an interface with the disk unit. The reference numeral 1360 represents a channel controller, which includes the channel control processors and has an interface with the host computer. In addition, the channel controller 1360 has a plurality of channels to the host computer. In FIG. 12, 4 channels are provided for every channel controller 1360, and 8 channels in total are provided for the two channel controllers. However, the number of channels per channel controller and the number of channel controllers provided in the disk subsystem are not restricted particularly.

FIG. 13 shows a flow chart for the ESCON cross-call. Processing on each of the host computer side and the disk subsystem side will be described below about the ESCON cross-call together with FIG. 13. Assume that the first ESCON channel 1310a and the second ESCON channel 1314a belong to a channel path group, and a request is issued from the first ESCON channel while a reply is transmitted from the second ESCON channel. Here, the channel path group denotes channels any of which may be used for communication between the host computer and the disk subsystem if it belongs to the channel path group. Accordingly, there is no problem even if a reply to a request received from the first ESCON channel is transmitted from the second ESCON channel.

A cross-call access start 1400 is specifically a processing of reading data from the disk unit. Hereinafter, on the foregoing assumption, description will be made on the processing of reading data from the disk unit by way of example.

First, the host computer transmits a first request through the first channel (1310a) (Step 1410). The channel control processor 1310b on the disk subsystem side receiving the first request analyzes the details of the request (Step 1415). At this time, the channel control processor 1310b concludes that reading data from the disk unit is requested.

The channel control processor once disconnects the first channel path (Step 1420), issues an instruction to read data from the disk unit, and makes preparations for transmitting data to the host computer (Step 1425).

When the preparations for transmitting data to the host computer are completed, a channel control processor belonging to the channel path group detects a notice of the completion of the preparations for data transmission (Step 1430), and issues a reconnection request to the host computer (Step 1435).

In consideration of the situation of the channels of the channel path group, the host computer receiving the reconnection request determines a channel through which a request is to be issued again. This is because the channel through which the first request was issued may carry out another processing or may be not available for some kind of failure. Here, the host computer chooses the second channel, and issues a request again therethrough (Step 1440). The channel control processor for controlling the second channel on the disk subsystem side analyzes the details of the request and transmits the prepared data to the host computer (Step 1440). The host computer receives the data (Step 1445). Thus, the processing is terminated (Step 1450).

When the aforementioned operation is observed in one I/O unit, a reply (here, data transmission) to a request is issued from a channel (second ESCON channel) different from a channel (first ESCON channel) through which the request was issued.

It is basic to the ESCON cross-call to make a reply to a request through a channel one and the same as the channel through which the request was received. Accordingly, when requests from a plurality of host computers are concentrated on one and the same channel, processing can be carried out merely sequentially. Not only protocol processing, processing for analyzing the requests and so on, but also internal processing of the disk subsystem are carried out so that a high load is applied to the control processor controlling the channel in question. Thus, the transfer performance deteriorates.

In addition, the ESCON cross-call using a channel path group constituted by a plurality of channel paths is a technique which is effective only when the host computer has a plurality of channel paths. Therefore, the ESCON cross-call cannot be applied to the system in which a host computer does not have a plurality of channel paths. Under the present circumstances, connection modes between storage and host computers have been diversified, but there are only a few host computers such as mainframes each having a plurality of channel paths.

Further, it is essential to form a channel path group compatible between the host computer and the disk subsystem. To that end, it is necessary to add some mechanism to the host computer side. The fact that some mechanism is essential for each host computer in spite of the presence of a non-specific number of host computers results in the absence of general purpose properties.

SUMMARY OF THE INVENTION

According to the present invention, when requests from the host computer side are concentrated on a specific I/O port, the processing of making a request for request processing is carried out inside a disk subsystem taking the situation of other I/O ports into consideration. Accordingly, the load on a control processor for controlling the signal I/O port is reduced. As a result, the reply to the host computer can be made rapidly and the transfer performance can be improved without providing any special means in the external environment or the host computer.

An I/O port through which a reply to the processed request from the host computer is finally given to the host computer is chosen by a channel controller.

In addition, according to the present invention, in practice, when an I/O port receiving a request from a host computer makes a request to another I/O port in the disk subsystem for performing request processing, control information about the received request is made accessible from both the channel controller side and the disk access controller side. As a result, any conflict is prevented from occurring as to the control information between the host computer and the disk subsystem, in practice, between I/O ports which issued the requests.

BRIEF DESCRIPTION OF THE DRAWINGS

FIG. 2 is a diagram showing the details of an access request table in Embodiment 1 of the present invention;

FIG. 3 is a diagram showing the details of a cross-call administration table in Embodiment 1 of the present invention;

FIG. 4 is a diagram showing the details of a TCP packet header;

FIG. 13 is a flow chart of ESCON cross-call processing.

DETAILED DESCRIPTION OF THE EMBODIMENT

[Embodiment 1]

Embodiment 1 of the present invention will be described below in further detail on a disk subsystem having a cross-call function with reference to the drawings.

Figure 1:
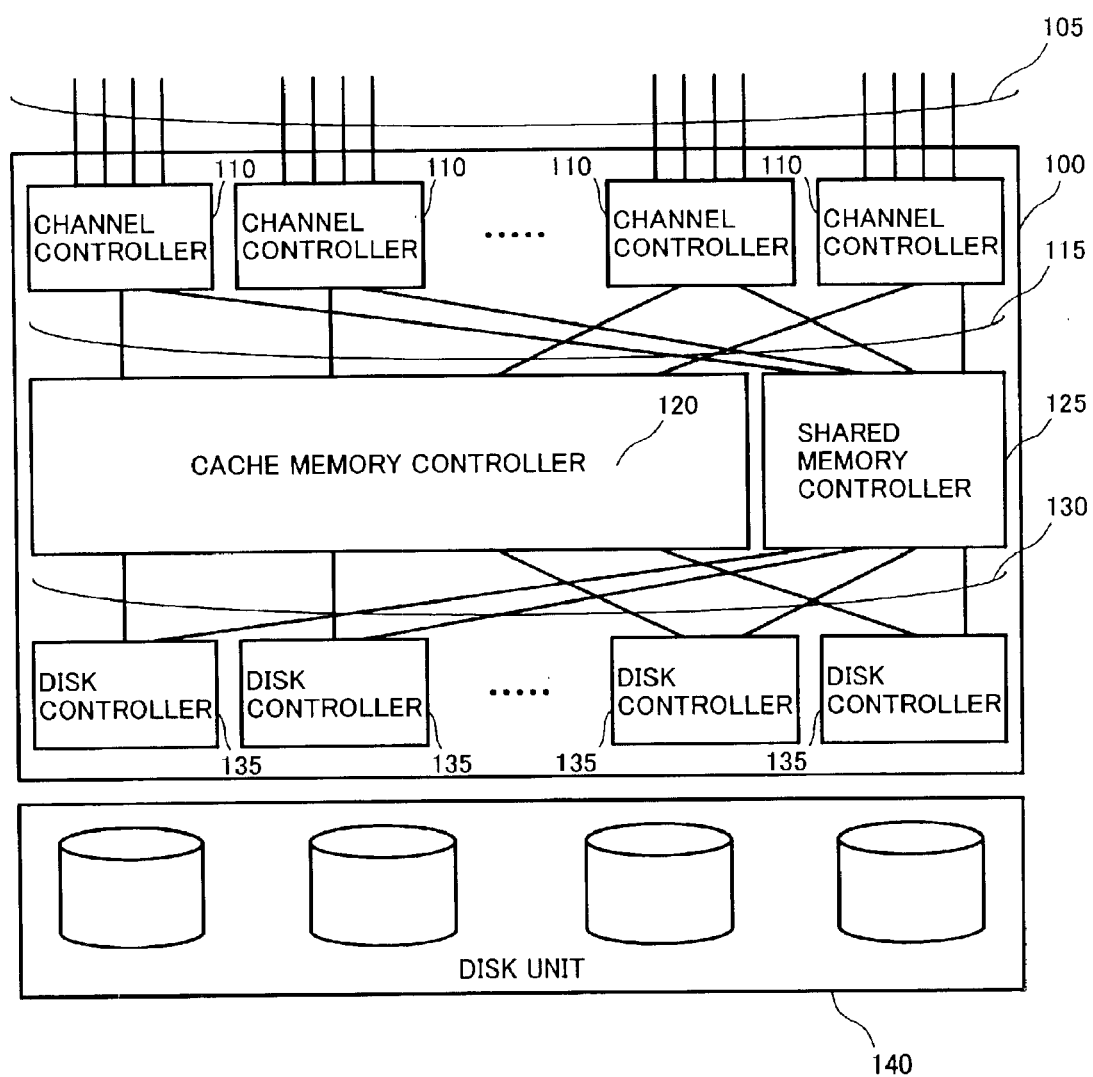
FIG. 1 is a diagram showing the configuration of a disk subsystem.
Figure 5:
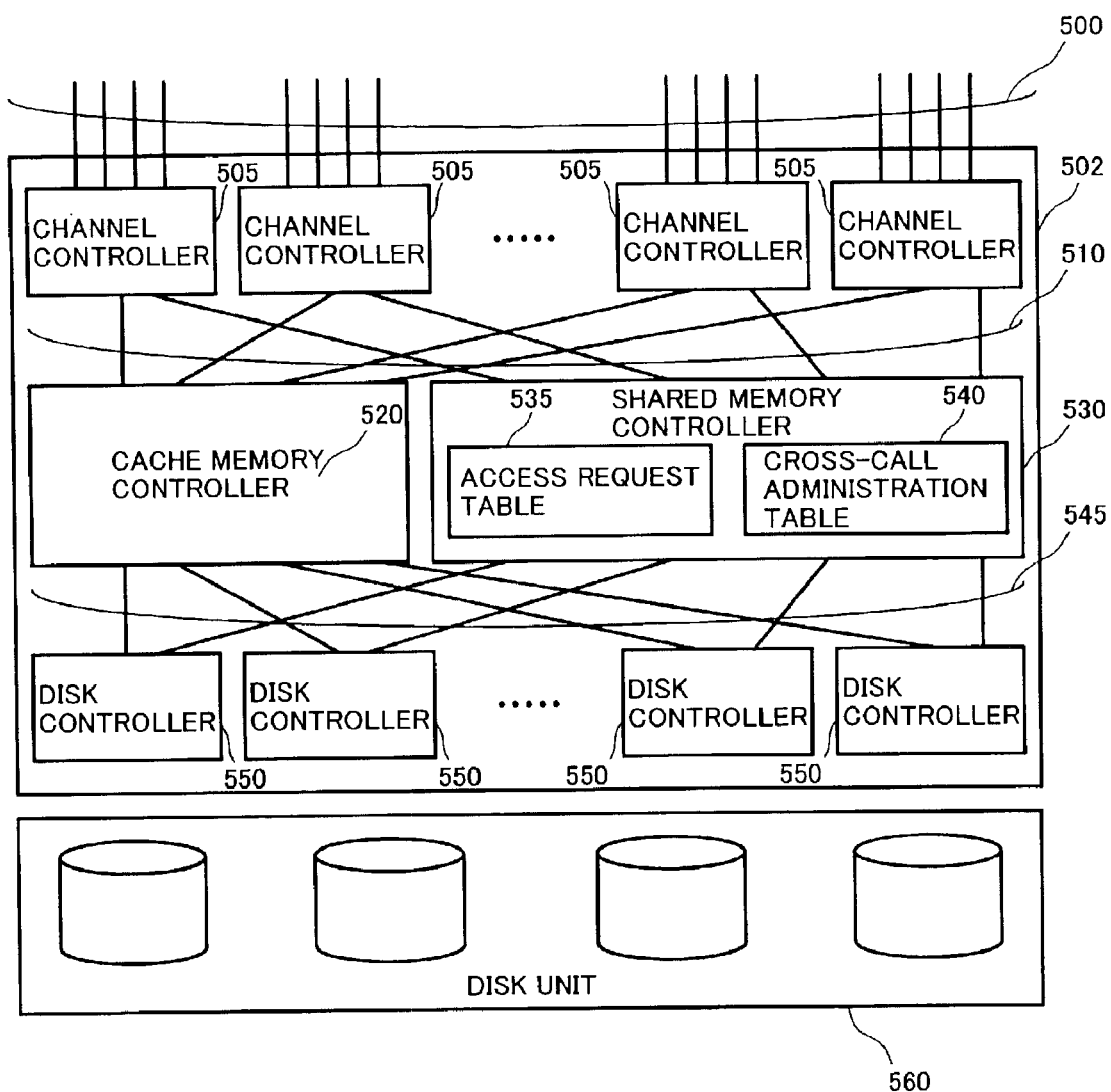
FIG. 5 is a diagram showing the whole configuration in Embodiment 1 of the present invention.

FIG. 5 shows a diagram of the whole configuration of a disk subsystem having a cross-call function according to Embodiment 1 of the present invention. The reference numeral 500 represents I/O paths, which are paths for connecting a host computer and channel controllers 505 in a disk subsystem 502. Incidentally, the channel controllers 505, a cache memory controller 520, a shared memory controller 530 and disk access controllers 550, which will be described below, respectively have I/O terminals through which signals are inputted and outputted. Each of the I/O terminals is referred to as an I/O port. The reference numeral 505 represents a channel controller, which has an interface with the host computer and carries out transmission/reception of user data to/from the host computer, control of shared data such as control information inside the disk subsystem 502, and so on. A plurality of channel controllers 505 are provided in the disk subsystem 502. The reference numeral 510 represents connection paths between the channel controllers and the cache memory controller and between the channel controllers and the shared memory controller. Communication of user data and communication of shared data are made through these paths. The reference numeral 520 represents a cache memory controller, which has a cache memory for temporarily storing user data from the host computer and the disk unit. The cache memory controller 520 controls cache memory accesses from the channel controllers or the disk access controllers.

The reference numeral 530 represents a shared memory controller, which has a shared memory for storing control information about communication made inside the disk subsystem, and tables for attaining cross-call. The shared memory controller 530 controls shared memory accesses from the channel controllers and the disk access controllers.

The reference numeral 535 represents an access request table, which is a table used when cross-call is attained. That is, a channel control processor in the channel controller which initially received a request from the host computer uses the access request table 535 to make a request to another control processor in the disk subsystem for processing of the received request. The reference numeral 540 represents a cross-call administration table, which is a table indicating channel control processors (ports) to which a request can be made for request processing. It can be considered that the I/O path connected to the disk subsystem 502 is connected directly to a host computer or connected to the host computer through a network. In the latter case, for example, assume that a request is received from a first I/O path, and a reply is transmitted from a second I/O path different from the first I/O path. In this case, when the second I/O path is connected to a network different from the network to which the host computer belongs, the reply cannot reach the host computer even if cross-call is carried out. Even if the reply can reach, the reply reaches the host computer through various paths. Therefore, a great influence is given to the transfer performance. The cross-call administration table 540 is a solution for this problem. In consideration of the situation of the places to which the I/O paths 500 are connected, identifiers indicating I/O paths through which replies to requests from host computers can be transmitted surely are stored in the cross-call administration table 540. The reference numeral 545 represents connection paths between the disk access controllers and the cache memory controller and between the disk access controllers and the shared memory controller. Communication of user data and communication of shared data are made through these paths.

The reference numeral 550 represents a disk access controller, which controls accesses to a disk unit 560, performs cache memory accesses and shared memory accesses, and so on. A plurality of disk access controllers 550 are provided in the disk subsystem 502. The reference numeral 560 represents a disk unit, which is constituted by a plurality of drives and stores user data and so on.

FIG. 2 shows the details of an access request table 200 in Embodiment 1 of the present invention.

The reference numeral 205 represents details of a request, which is an area to be written in by a channel control processor receiving a request initially. The area 205 designates the details of processing to be requested. The reference numeral 210 represents a source port identifier, which indicates a channel control processor of an I/O port through which the request was made. The reference numeral 215 represents a sequence number, which is expressed by the serial number added to the packet of the request. The sequence number 215 is used as component information of a packet which will be generated when a channel control processor receiving an access request transmits a reply to a host computer. The reference numeral 220 represents a port number, which is an identifier indicating the connection relation between the host computer and an I/O port. Similarly to the sequence number 215, the port number 220 is used as component information of the packet which will be generated when the channel control processor receiving the access request transmits the reply to the host computer. The reference numeral 225 represents a ready flag, which is a flag indicating that the reply has been allowed to be transmitted to the host computer as a result of processing designated by the channel control processor receiving the request for request processing. When the ready flag 225 is "1", it shows the state where desired data is present on the cache memory. On the contrary, when the ready flag 225 is "0", it shows the state where desired data has not yet been prepared on the cache memory, or an idle state. The reference numeral 230 represents a cache stored address, which is an address indicating the place where the desired data has been stored on the cache. The reference numeral 235 represents a data transmission end flag, which is a flag indicating that the reply has been transmitted to the host computer through the I/O path controlled by the channel control processor receiving the access request. When the data transmission end flag 235 is "1", it shows the state where the reply has been transmitted to the host computer. On the contrary, when the data transmission end flag 235 is "0", it shows the state where the reply is on the way of transmission or an idle state.

Figure 8:
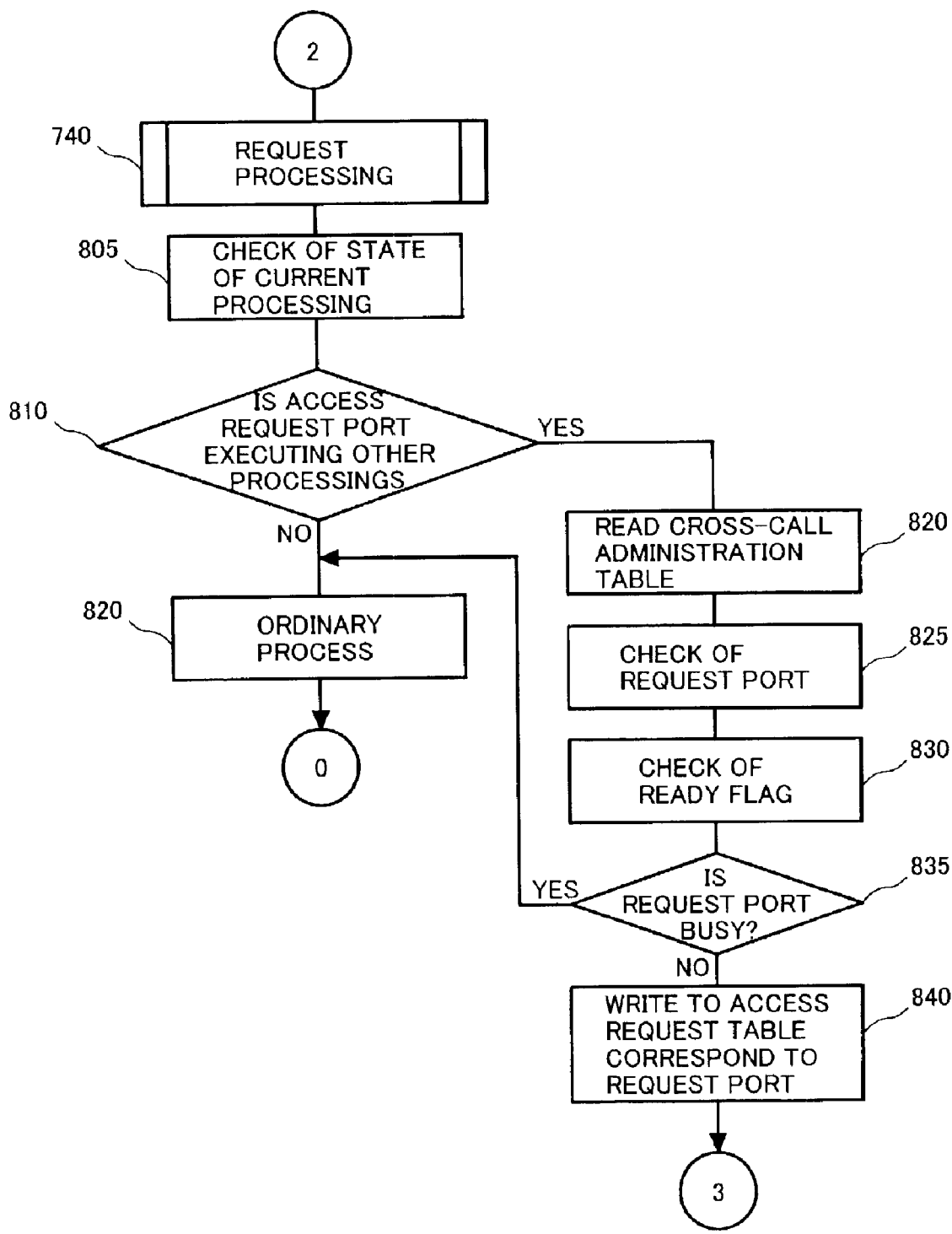
FIG. 8 is a flow chart from the command interpretation to request processing made to a request port in Embodiment 1 of the present invention.

Here, in Step 805 for checking the state of current processing in FIG. 8, by use of the ready flag and the data transmission end flag, it is judged whether the request for access is made to another channel control processor.

If the ready flag 225 is "0" and the data transmission end flag 235 is "0", the channel control processor is ready, and it is indicated that an access request can be made to the channel control processor.

If the ready flag 225 is "0" and the data transmission end flag 235 is "1", an error occurs because such a state is impossible.

If the ready flag 225 is "1" and the data transmission end flag 235 is "0", it shows the state where a reply is being transmitted or is going to be transmitted to a host computer under the control of the channel control processor requested for access. If the ready flag 225 is "1" and the data transmission end flag 235 is "1", it shows the state where transmission to the host computer has been finished. After this state, both the flags will take "0" and the channel control processor will undergo a transition to a ready state.

FIG. 3 shows the details of the cross-call administration table in Embodiment 1 of the present invention. The reference numeral 305 represents a source port, which indicates an identifier for identifying a channel control processor 605 inside the disk subsystem 502. The reference numeral 310 represents a request port, which indicates a port (channel control processor) to which a request can be made for access in Step 825 for checking the request port in FIG. 8.

In the processing in Step 820 for reading the cross-call administration table in FIG. 8, a channel control processor designates an identifier corresponding to the channel control processor itself so as to check the request port 310.

FIG. 4 shows a format of a TCP segment.

The reference numeral 405 represents a source port number, which indicates a port number of an application layer service which transmitted the segment. The reference numeral 410 represents a destination port number, which indicates a port number of an application layer service which received the segment. The reference numeral 415 represents a sequence number, which is a number to be counted up whenever a segment is transmitted/received. The reference numeral 420 represents an acknowledgement number, which indicates that data corresponding to the value obtained by subtracting 1 from this acknowledgement number was received. The reference numeral 425 represents a data offset, which indicates the header length of the segment. The reference numeral 430 represents a reserved area (Rsv.), which indicates predetermined contents regardless of segment. The reference numeral 435 represents code bits, which are used for connection control and the like. For example, in order to terminate a connection, a value indicating FIN is set in this area. The reference numeral 440 represents a window size, which indicates how large data size can be transmitted from the source. The reference numeral 445 represents a checksum, which is a check code, which the header and the data. The reference numeral 450 represents an urgent pointer, which indicates the end of a data field 465 for urgent processing. The reference numeral 455 represents an option, which is a field that can designate the maximum segment length. The reference numeral 460 represents a padding, which is an area for guaranteeing that the data should start in 32-bit unit.

When the I/O port receiving a request from the host computer makes a request to another I/O port for processing, the source port number 405, the destination port number 410, the sequence number 415 and the acknowledgement number 420 are transmitted to the channel control processor, which controls the request I/O port, through the access request table so as to prevent conflict in protocol.

Figure 6:
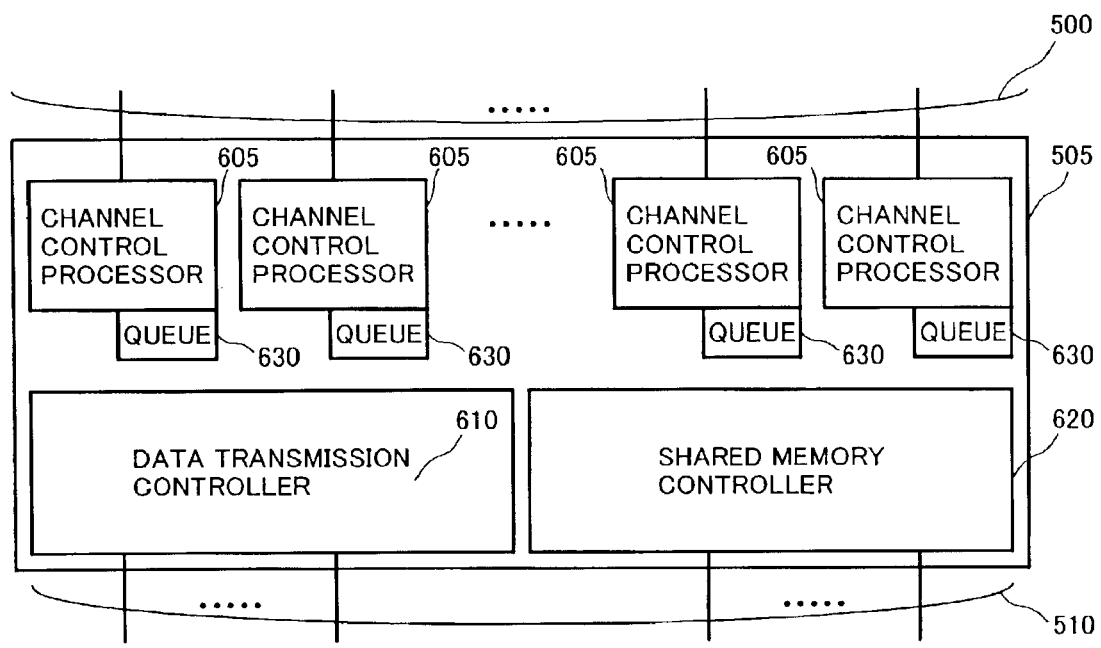
FIG. 6 is a diagram showing constituent blocks of a channel controller in Embodiment 1 of the present invention.

FIG. 6 shows the constituent blocks of a channel controller in Embodiment 1 of the present invention.

The reference numeral 605 represents a channel control processor, which is a processor for receiving and analyzing a request arrived from the host computer through the I/O path 500, and giving instructions to the entrails of the disk subsystem in accordance with the details of the request analyzed. The reference numeral 610 represents a data transmission controller, which carries out processing for the transmission of user data transmitted from the host computer and the reading of data from the disk unit in accordance with the instructions from the channel control processor 605. The reference numeral 620 represents a shared memory controller, which controls access to the shared memory in which shared data such as control information and so on have been stored.

Figure 7:
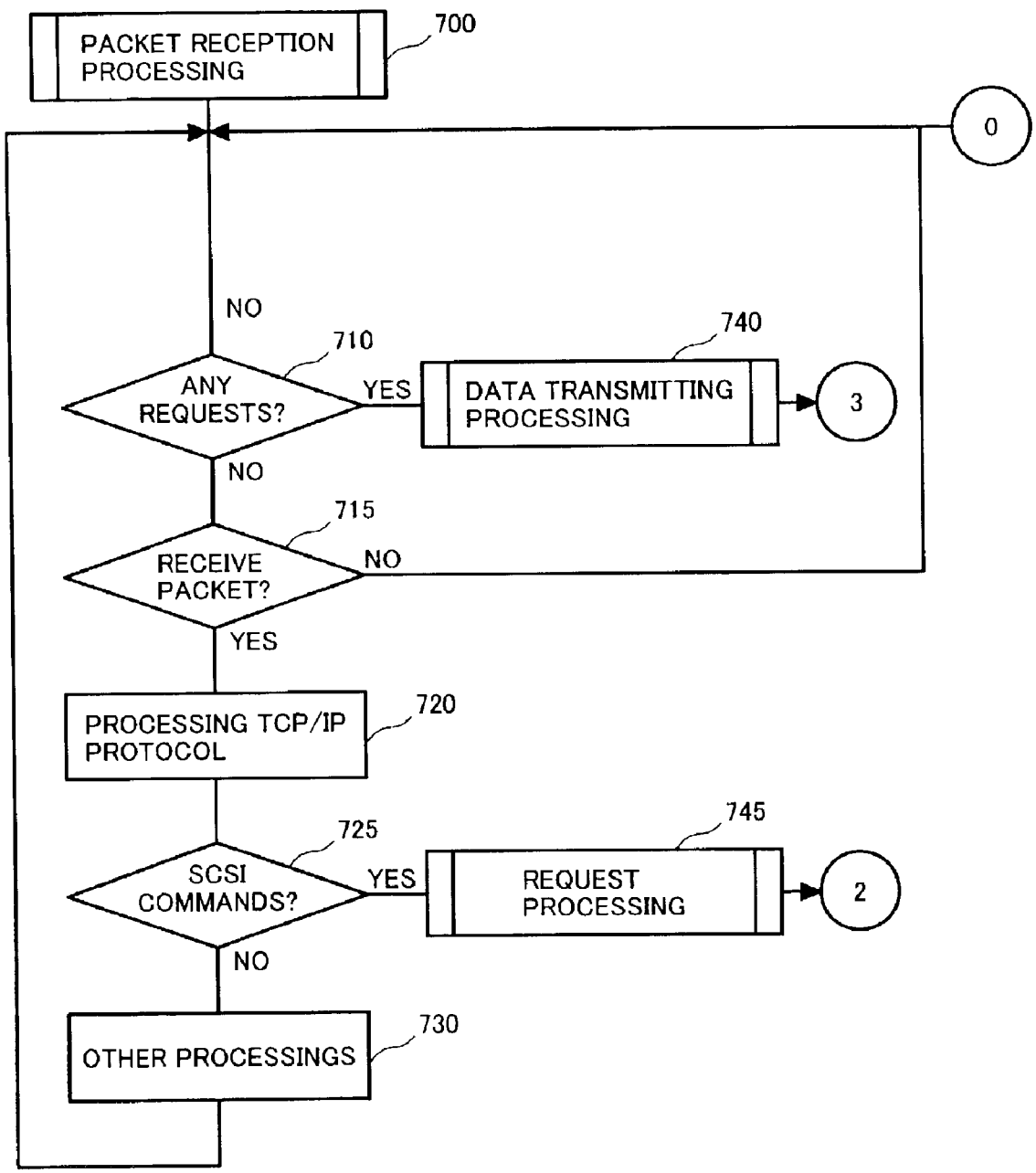
FIG. 7 is a flow chart from reception of a request from a host computer to command interpretation in Embodiment 1 of the present invention.

FIG. 7 shows a flow chart from the reception of a request from the host computer to the judgement whether the processing of the request is to be requested according to Embodiment 1 of the present invention. In Step 710, it is judged whether an access request has been received from another channel control processor. If an access request has been received, the routine will branch to Step 740 for data transmitting processing. If no access request has been received, the routine will advance to Step 715. In Step 715, it is confirmed whether a packet including a request has been received from the host computer. If the packet has not yet been received, the routine returns to Step 700 for starting the packet reception processing. If the packet has been received, the routine advances to Step 720 for processing the TCP/IP protocol. In Step 720, processing for extracting SCSI commands from the received packet is carried out. The SCSI commands are capsulated as a datagram of an IP packet and transmitted from the host computer. In Step 725, processing is carried out for judging whether the extracted commands are SCSI commands. If they are SCSI commands, the routine branches to Step 745 for request processing. If they are not SCSI commands, the routine advances to Step 730 for other processings. In Step 730, processings corresponding to the datagram of the IP packet are carried out. Then, the routine returns to Step 700 for the packet reception processing again.

On the other hand, when a packet is received from a host computer during the data transmitting processing in Step 740 or the request processing in Step 745, the request is put into a queue in each I/O port. Thus, even if each channel control processor receives an access request from another channel control processor, the channel control processor can execute the processing for the access request.

FIG. 8 shows a flow chart for a request port judgement process. When it is concluded in Step 725 that an SCSI command request has been received, the request processing in Step 745 is started. In Step 805, the state of processing in the channel control processor receiving a request is checked.

The determination is based on whether the queue depth (the sum of the number of processings running currently and the number of processings stacked as jobs) exceeds a certain constant number or not. When it is determined in Step 810 that the processing can be carried out in the channel control processing receiving the request in Step 805, the routine advances to Step 815 for an ordinary process. If the processing cannot be carried out, the routine branches to Step 820 for making a request to another channel control processor for the processing. In Step 815, the request processing is executed by the channel control processor receiving the request. Then, the routine returns to Step 700 for the packet reception processing. In Step 820, the cross-call administration table is read out, and it is checked in Step 825 which channel control processor can be requested for the processing. In Step 830, a request port is determined on the basis of the ready flag 225 and the data transmission end flag 235 of the request port. In Step 835, it is judged whether all the channel control processors which control the I/O ports and which can be requested are busy. If all is busy, it is determined that the processing will be carried out by the channel control processor receiving the request. Then, the routine jumps to Step 815 for the ordinary process. If all is not busy, the routine advances to Step 840. In Step 840, writing to the access request table is performed to make a request for the request processing. The written contents include details of processing, and control information. In Embodiment 1, the contents include the source port identifier, the sequence number and the port number. Here, the control information is not limited to the sequence number and the port number, but designates information for keeping consistency between the host computer and the I/O port. After Step 840, the routine returns to Step 700 for the packet reception processing.

Figure 9:
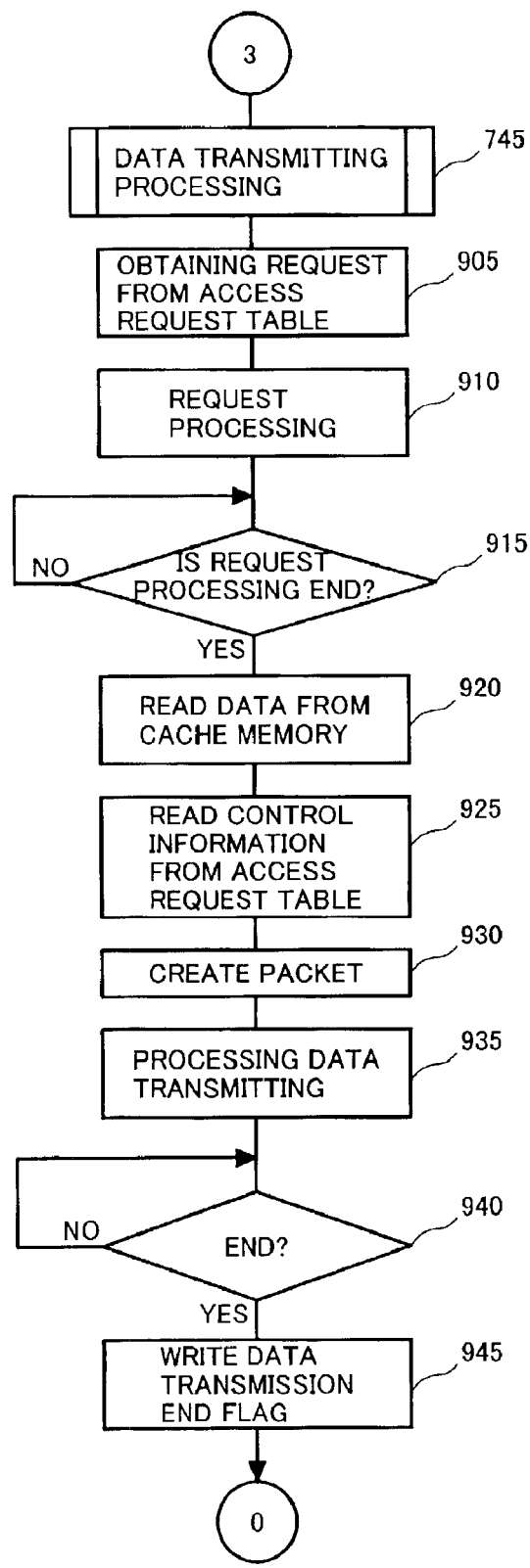
FIG. 9 is a flow chart from data extraction from a disk unit to completion of data transmission to the host computer made by a request processor in Embodiment 1 of the present invention.

FIG. 9 shows a flow chart of the data transmitting processing of the channel control processor requested for the request processing. Data transmitting processing is started in Step 745 when it is detected that a request for the request processing has been received from another channel control processor. In Step 905, the request details 205 written in the access request table are acquired. In Step 910, processing is carried out in accordance with the request details 205 acquired in Step 905. In Step 915, the routine waits until the processing of Step 910 is terminated. The routine loops in Step 915 during the processing. As soon as the processing is terminated, the routine advances to Step 920. At this time, the ready flag 225 indicating that the processing is terminated is written on by the disk control processor of the disk access controller. The channel control processor in question detects the termination of the request processing through the ready flag 225.

In Step 920, data stored on the cache memory is read out in accordance with the cache stored address 230 of the access request table 200. In Step 925, the control information 207 of the access request table 200 is read out. In Step 930, a packet to be transmitted to the host computer is created from the data read out in Step 920 and the control information 207 read out in Step 925. Then, the data transmitting processing in Step 935 is carried out. In Step 940, the data transmission end flag 235 of the access request table 200 is written on (step 945) as soon as the processing of Step 935 is terminated. Then, the routine returns to Step 700 for the data reception processing. As described above, according to Embodiment 1 shown in FIGS. 5 to 9, in a disk subsystem having a plurality of I/O paths, an access request table and a cross-call administration table are provided in a global memory of the disk subsystem. Accordingly, a channel control processor which controls an I/O path and which received a request from a host computer can make a request for the processing of the received request to another channel control processor controlling another I/O path in the disk subsystem. Thus, the use efficiency of the disk subsystem as a whole can be increased, and the load on the channel control processor requested initially can be reduced.

[Embodiment 2]

Another disk subsystem having a cross-call function according to Embodiment 2 of the present invention will be described below in detail with reference to the drawings. Incidentally, parts which will not be described below specifically are regarded as the same as the corresponding parts in Embodiment 1. This embodiment is different from Embodiment 1 in that, when a request from a host computer designates data reading processing, read data is divided and transmitted through a plurality of I/O ports shown in a cross-call administration table.

Figure 10:
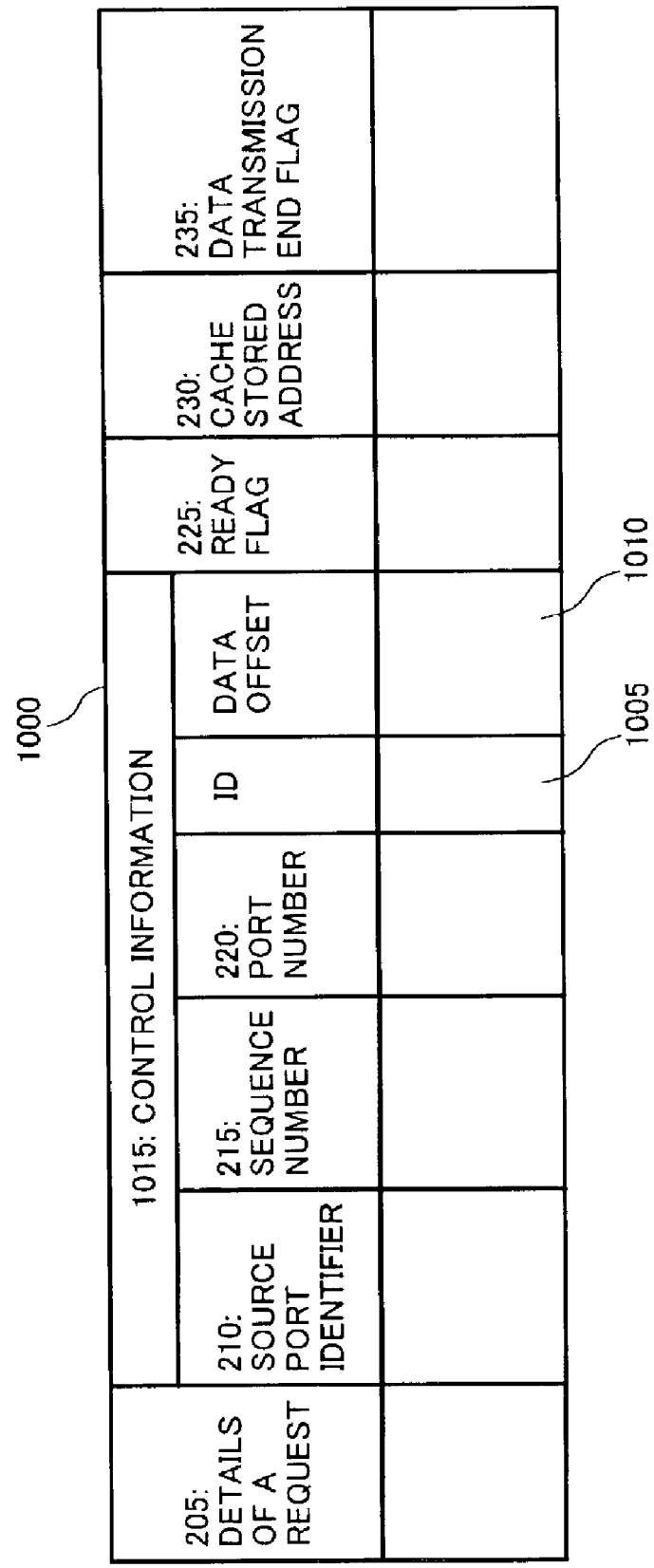
FIG. 10 is a diagram showing the details of an access request table in Embodiment 2 of the present invention.

FIG. 10 shows an access request table 1000 in Embodiment 2 of the present invention. The access request table 1000 is different in the details of control information 1015 from that of Embodiment 1. In Embodiment 2, an ID 1005 and a data offset 1010 are added to the control information 207 of Embodiment 1.

The ID 1005 is an identifier for establishing consistency in the divided data. The ID 1005 is set in a flag field in the IP header of a packet created when the data is transmitted to the host computer. Thus, the divided data can be restored by referring to this flag field for the packet transmitted from a plurality of I/O ports. The data offset 1010 indicates the place where the divided data is located in the data which has not yet been divided.

Figure 11:
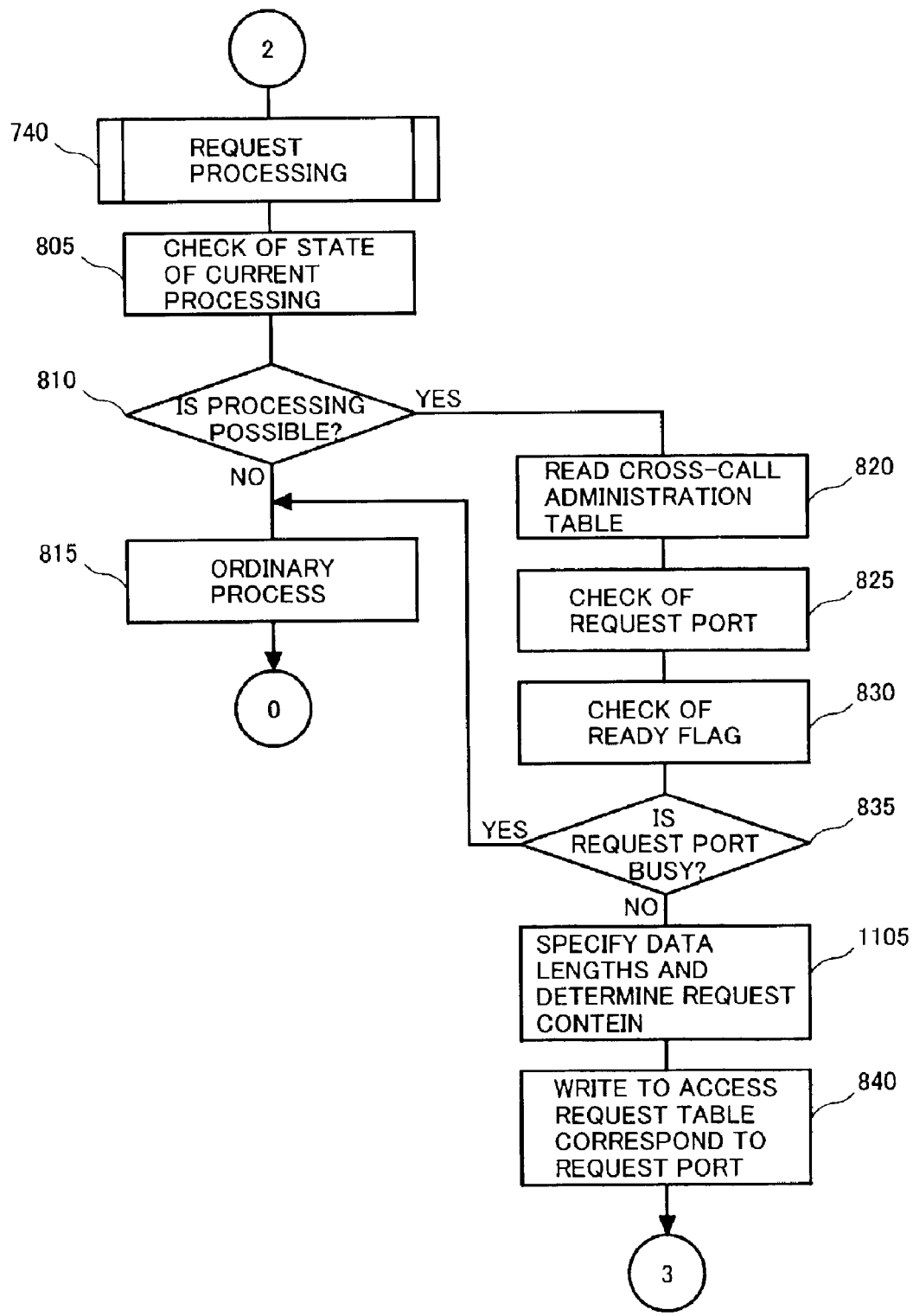
FIG. 11 is a flow chart from command interpretation to request processing made to a request port in Embodiment 2 of the present invention.
Figure 12:
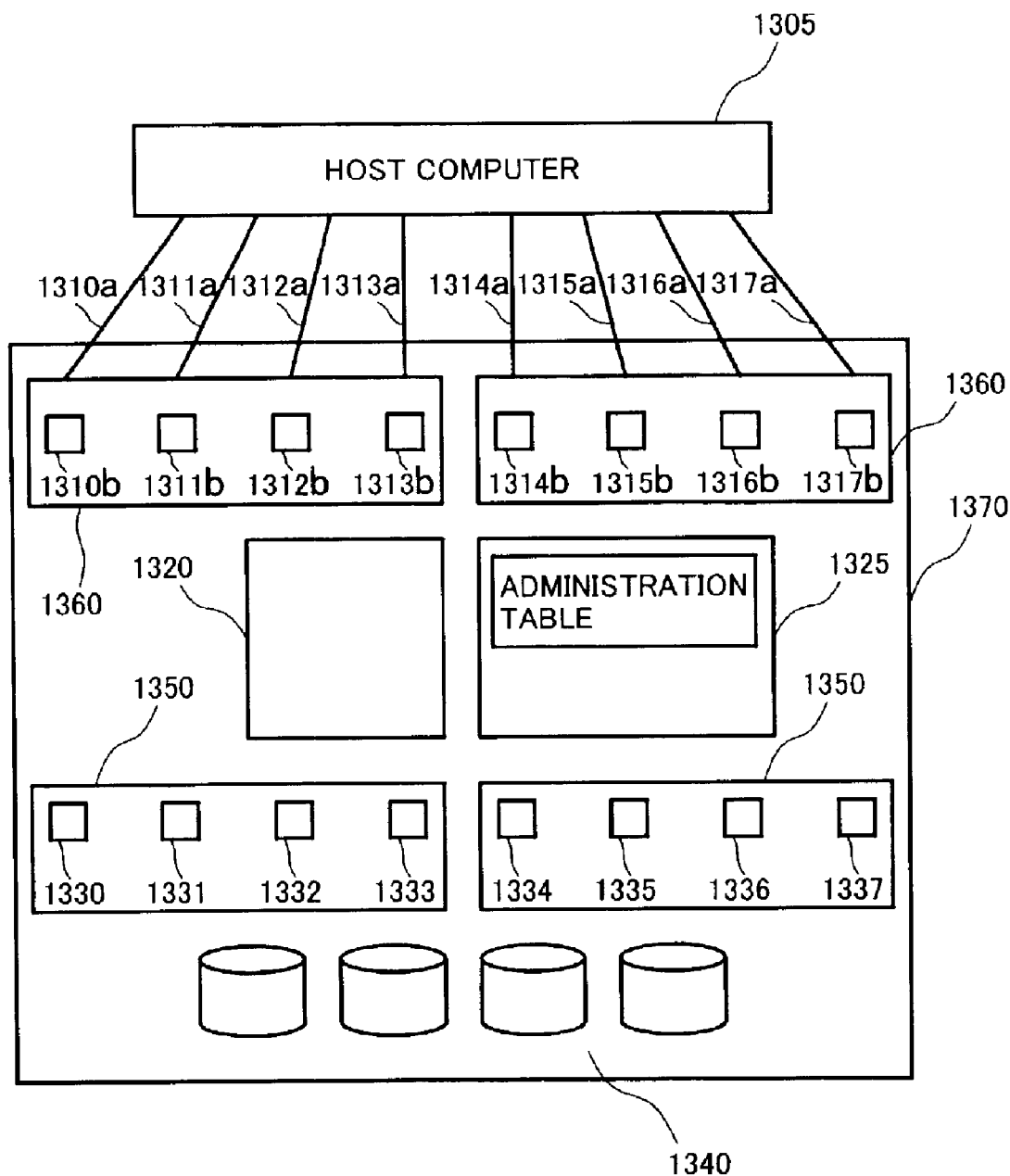
FIG. 12 is a diagram showing the whole configuration in ESCON cross-call.

FIG. 11 shows a flow chart of a request port judgement process in Embodiment 2 of the present invention. The process is different from that in Embodiment 1 in that the following processing is added. That is, after a channel control processor receiving a request confirms request ports, the channel control processor assigns access data length to the request ports. In Step 1105, the access data length obtained from the request details from the host computer is divided by the number of the request ports, and the value obtained thus is used as the access data length to determine the details of an access request.

As described above, processing can be executed in parallel over a plurality of I/O ports. Thus, the throughput is improved.

A high load is applied on a channel control processor on which requests have been concentrated to thereby cause lowering in the throughput. Processing for the concentrated requests is requested to other channel control processors, so that the load on the channel control processor on which the requests have been concentrated is reduced, and the throughput to the request sources is improved.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk subsystem comprising:

a disk unit;

a disk access controller for controlling said disk unit;

a channel controller for making communication with a host computer;

wherein said channel controller has a plurality of I/O ports for passing signals for making communication with said host computer, wherein said I/O ports have control processors for controlling said signals passing said I/O ports, respectively, wherein said channel controller chooses, among said plurality of I/O ports, an I/O port through which a reply to said host computer is to be transmitted; and an access request table in which an identifier of an I/O port receiving a request from said host computer, and control information including an identifier of said I/O port chosen by said disk access controller are recorded, and wherein, when said I/O port receiving a request from said host computer is defined as a reception port, one of said control processors associated with the reception port transmits said request from said host computer to one of said control processors which is associated with said I/O port and which is chosen by said channel controller.

2. A disk subsystem according to claim 1, wherein: when said control processor associated with said I/O port to which said request from said host computer is transmitted is defined as an access request processor, said access request processor carries out processing for said transmitted request from said host computer, and a reply to said request is transmitted to said host computer through said I/O port associated with said access request processor.

3. A disk subsystem according to claim 2, wherein: when said reply to said request is transmitted to said host computer, said access request processor transmits packet information to said host computer, said packet information being created based on said access request table.

4. A disk subsystem according to claim 1, further comprising:

a cross-call administration table showing I/O ports to which request processing can be requested from said reception port.

5. A disk subsystem according to claim 4, further comprising:

a shared memory in which said access request table and said cross-call administration table are stored.

6. A disk subsystem according to claim 1, wherein each of said control processors associated with said I/O ports excluding said reception port refers to said access request table so as to judge whether processing for said request has been transmitted to said control processor itself or not.

7. A disk subsystem according to claim 1, wherein said control processor of said reception port broadcasts said request from said host computer to a plurality of I/O ports other than said reception port so that processing of said request is requested to said other control processors.

8. A disk subsystem according to claim 1, wherein said control processor of said reception port chooses one among other I/O ports, and transmits processing of said request to said chosen I/O port.

9. A disk subsystem according to claim 3, wherein said access request processor gives said control processor of said reception port a notice that said reply to said host computer is completed, and said control processor of said reception port disconnects said host computer in accordance with said notice.

10. A disk subsystem according to claim 9, wherein when said access request processor gives said notice to said control processor of said reception port, said access request processor writes a flag indicating completion of said reply host computer into said access request table, so that completion of said reply to said host computer is transmitted to said control processor of said reception port.

11. A disk subsystem according to claim 10, wherein said access request processor broadcasts a notice of completion of said reply to said host computer to a plurality of I/O ports, so that said reception port is informed of completion of said reply to said host computer.

12. A disk subsystem according to claim 10, wherein said access request processor informs only said reception port of completion of said reply to said host computer.

* * * * *